Feb. 5, 1963

S. G. FRANCISCO 3,076,938

TRANSMISSION GATE COMPRISING VOLTAGE DIVIDER FLOATING NODE ALTERNATELY GROUNDED AND ISOLATED FROM GROUND

Filed June 30, 1958

2 Sheets-Sheet 1

INVENTOR.
Sherman G. Francisco by Ralph R Barnard
ATTORNEY

Feb. 5, 1963

S. G. FRANCISCO 3,076,938

TRANSMISSION GATE COMPRISING VOLTAGE DIVIDER FLOATING NODE ALTERNATELY GROUNDED AND ISOLATED FROM GROUND

Filed June 30, 1958

2 Sheets-Sheet 2

United States Patent Office 3,076,938

Patented Feb. 5, 1963

3,076,938

TRANSMISSION GATE COMPRISING VOLTAGE DIVIDER FLOATING NODE ALTERNATELY GROUNDED AND ISOLATED FROM GROUND

Sherman G. Francisco, Endicott, N.Y., assignor to International Business Machines Corporation, New York, N.Y., a corporation of New York Filed June 30, 1958, Ser. No. 745,432
10 Claims. (Cl. 328—101)

Figures 1, 2A:
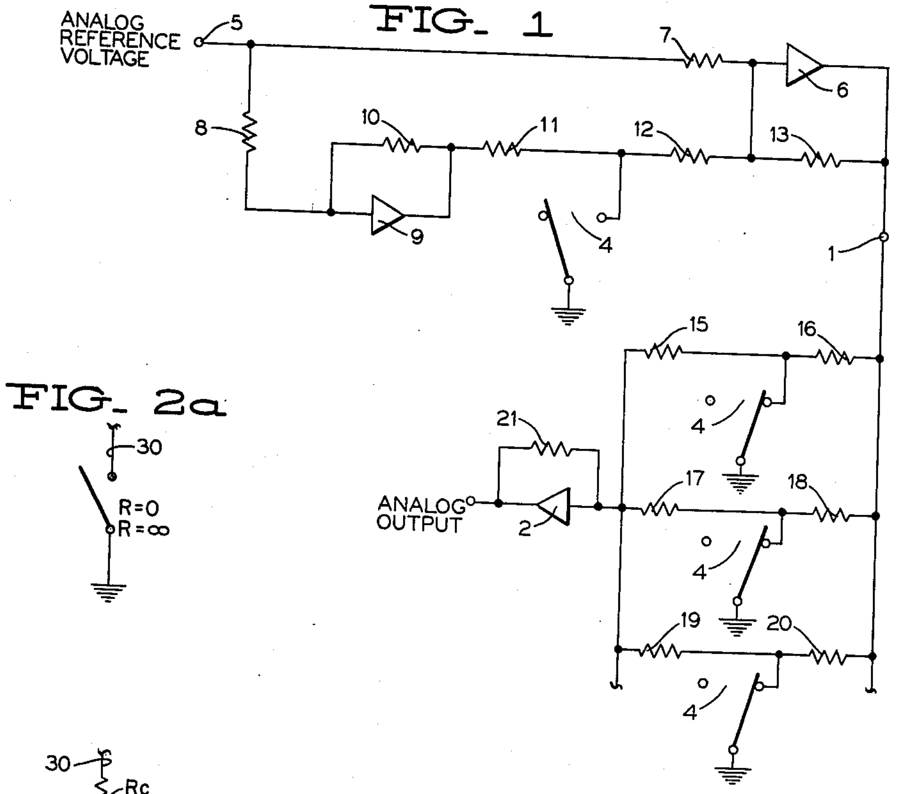

This invention relates to n improvement in digital-to-analog conversion circuitry and more particularly to a new and improved high-speed and accurate conversion system which is applicable to both alternating current and direct current analog systems.

In the electronic computer field, it is often desired to communicate between computers or portions thereof utilizing digital information to another computer or portion thereof utilizing analog information, or vice versa. It is the means for conversion of digital information for use in an analog computer system with which the present invention is particularly concerned. As is well known, analog systems may be of either the direct current type where the magnitude of a voltage represents the magnitude of the computer quantity, and its polarity represents the sign of that computer quantity; or of the alternating current type where the ratio of the magnitude of the signal voltage with respect to a reference voltage represents the computer quantity, and the phase of the signal voltage with respect to the phase of the reference voltage represents the sign of that computer quantity.

A divisional application entitled "Electronic Switching Apparatus," Serial No. 78,559, filed December 27, 1960, relates to the new and improved digital-to-analog conversion techniques described hereinafter. This application has been limited to an improved electronic switching means which exhibits low resistance during its closed switch mode of operation and very high resistance during its open switch mode of operation.

In the prior art, electronic digital-to-analog conversion techniques often lack a high degree of accuracy with the result that the communication between digital and analog computation elements is seriously impaired. One technique known in the prior art is to selectively energize each of a plurality of digitally weighted, i.e., binary, summing resistors through a mechanical single-pole double-throw type switch so that an analog reference voltage is applied to one of the contacts, while a signal reference source (such as signal ground) is applied to each of the other contacts. Although this technique provides a high degree of accuracy, the use of a mechanical single-pole double-throw switch limits the application to digital conversion speeds much below those often desired in present day applications.

Another technique known in the prior art is to selectively energize each input of a digitally weighted summing resistor lattice through a series type electronic switch which effectively acts as a constant current generator in accordance with the digital information being converted. While this technique is of the electronic type and operates at high speeds, it results in considerable electrical circuitry to provide each constant current generator and switch combination and is particularly undesirable in view of the fact that the technique does not lend itself to the use of an alternating current analog reference voltage. As a result, this conversion is limited to digital-to-direct current analog applications.

This limitation is significant when it is pointed out that the alternating current analog computer has wide use, particularly in the fields of industrial automation and airborne navigation and bombing devices. For example, it is presently considered a highly desirable development technique to use an analog computer to simulate a control system while under development in combination with a digital computer to simulate the practical control problems with which the proposed control system will be designed to operate. As the portions of the control system are completed, they are substituted for the appropriate element or elements in an analog computer for purposes of checking their design and performance, thereby advancing the design of the individual elements rather than delaying system tests until all working elements are arranged in the working combination.

It is, therefore, a primary object of the present invention to provide a new and improved high speed and accurate digital-to-analog conversion system which is applicable to both alternating current and direct current analog systems.

It is another object of the present invention to provide a new and improved electronic switching means.

It is still another object of the present invention to provide a new and improved electronic switching means which exhibits a low resistance during its closed switch mode of operation and a very high resistance during its open switch mode of operation.

It is an additional object of the present invention to provide a new and improved electronic switch which exhibits a low resistance during its closed switch mode of operation while passing alternating current.

It is an additional object of the present invention to provide a new and improved bistable electronic switch which maintains a terminal at signal ground reference during operation in one stable condition and isolates that terminal from the signal ground reference during operation in the other stable condition.

Other objects of the invention will be pointed out in the following description and claims and illustrated in the accompanying drawings which disclose, by way of examples, the principle of the invention and the best mode which has been contemplated of applying that principle.

Figure 2B:
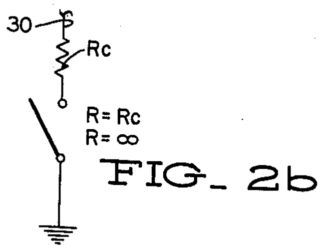
Figure 2C:
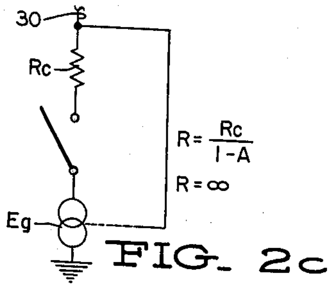
Figure 3:
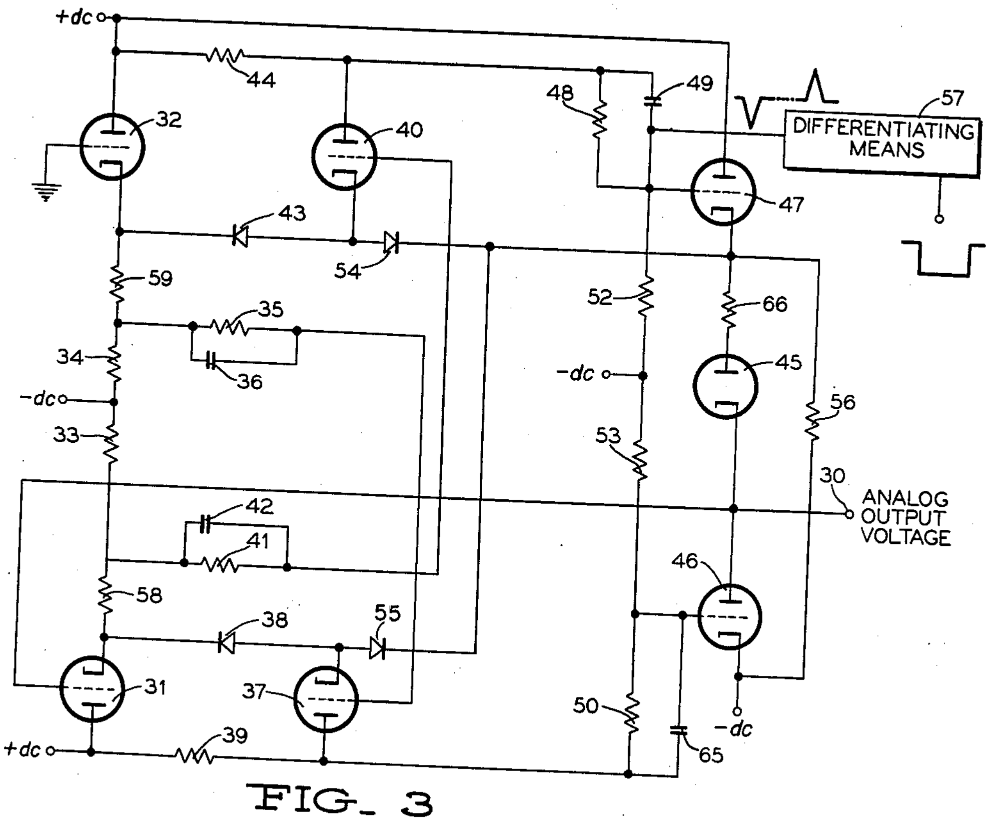

In the drawings:

FIG. 1 shows an electrical block diagram of a digital-to-analog converter in which the new and improved bistable electronic switch may be incorporated according to the present invention to provide for accurate operation at high speeds in both A.C. and D.C. analog systems;

FIG. 2*a* shows an electrical diagram of an idealized electrical switch;

FIG. 2*b* shows an electrical diagram of a conventional clamp circuit used as a switch;

FIG. 2*c* shows a diagram of an equivalent electrical circuit of the improved electronic switch, according to the present invention; and FIG. 3 shows an electrical schematic of a preferred embodiment of the improved electronic switch, according to the present invention.

The present invention relates to a new and improved digital-to-analog conversion as a result of the use of an improved electronic switch.

Briefly, a reference voltage of one phase or the other (or of one polarity or the other, depending upon the type of analog system) is applied through parallel summing resistance paths (one for each significant digit) to the input of a summing amplifier with the summing resistance paths having digitally weighted resistance values in accordance with the particular digital code selected. Improved electronic switching means are then provided to ground or isolate (with reference to a signal ground) each summing resistance path according to the magnitude of the digital quantity desired to be inserted as an analog quantity into the analog system. The improved electronic switch, which will be described in considerable detail hereinafter in connection with FIGS. 2 and 3, is connected in parallel with a portion of each summing resistance path in a manner such that it may determine whether or not the reference voltage being applied to each summing resistance path contributes to the input of a summing amplifier in accordance with its open or closed condition. The improved electronic switch has a bistable operation with a very low, effective resistance during the closed switch mode of operation corresponding to one condition and a very high resistance during the open switch mode of operation. Because the improved bistable electronic switch can maintain a terminal at substantially a signal ground voltage level during one of its stable conditions when either an A.C. or D.C. reference voltage is being applied and isolate the terminal from the signal reference during the other stable condition, a universal high-speed, digital-to-analog converter may be constructed to operate with a high degree of accuracy which is compatible with both A.C. and D.C. analog systems.

Referring to FIG. 1, an A.C. reference voltage is applied to input terminal 5 for application to summing amplifier 6 over two parallel paths. The first path consists of summing resistor 7; and the second path includes summing resistor 8, summing amplifier 9, feedback resistor 10, summing resistor 11 and summing resistor 12. Assuming that summing resistor 7 applies an A.C. reference voltage of a first phase directly to summing amplifier 6, an identical voltage will be applied through summing resistor 8 to summing amplifier 9. If summing amplifier 9 has a feedback resistor 10 of a magnitude equal to twice that of resistor 8, amplifier 9 will provide an output voltage commensurate with twice the reference voltage and reversed in phase. This output voltage is then applied through summing resistors 11 and 12 to summing amplifier 6 in parallel with its other input voltage to derive an output voltage therefrom commensurate with the algebraic sum of the two input voltages. The magnitude of the resistances of each of resistors 11 and 12 is equal to one-half of the magnitude of resistors 7 and 13.

Accordingly, the voltage appearing at terminal 1 will be equal to the reference voltage with a first phase. On the other hand, if it is desired that the reference voltage be of the reversed phase, an electronic switching means 4 may be utilized to ground the junction of summing resistors 11 and 12, thereby grounding that input voltage to summing amplifier 6. As a result, the voltage appearing at terminal 1 will be modified to be equal to the reference A.C. voltage with a reversed phase. The operation and functional relationship of the summing resistors and amplifiers are the same for a D.C. reference voltage being applied to terminal 5 as for an A.C. reference voltage, except that polarity replaces phase as the parameter providing the measure of sign. Alternating current or direct current summing amplifiers, which will work satisfactorily in the manner described herein in connection with FIG. 1, are well known to those skilled in the art.

In order to provide a high degree of accuracy for both an A.C. or a D.C. analog system, switch 4 may be of the improved electronic switch type. The voltage at terminal 1, whether A.C. or D.C. may then be applied to summing amplifier 2 via any of the parallel summing resistance paths shown with each corresponding to an order of significance of the digital information being inserted into the analog system. The summing resistance path corresponding to the highest order of significance is shown consisting of resistors 15 and 16 having their common terminals connected to signal ground through improved electronic switch 4. The summing resistance path corresponding to the next lower order of significance comprises resistors 17 and 18 having their common terminals connected to signal ground through an improved electronic switch 4. The summing resistance path corresponding to the next lower order of significance comprises resistors 19 and 20 having their common terminals connected to ground through an improved electronic switch 4. There will be a summing resistance path for each digital order of significance utilized to define the digital computer information which it is desired to convert and insert into the analog system. Therefore, the number of summing resistance paths used obviously will be a matter of choice depending upon the particular design considerations. Summing amplifier 2 is shown having a conventional feedback resistor 21.

When all of the switches 4 (in the decoding ladder) are in the closed condition, as shown, the voltage input to summing amplifier 2 will be equal to zero (signal ground) since the reference voltage being applied through terminal 1 for each of the summing resistances is then grounded through the respective resistors 16, 18, 20, etc. However, if the switches 4, connected to each parallel summing resistance path, are selectively opened in accordance with the instantaneous digital input information and if the total resistance magnitude in each summing resistance path is appropriately weighted in accordance to the radix of the digital code being used, the sum of the voltage being applied to summing amplifier 2 will have a magnitude and phase commensurate with the instantaneous analog representation of the digital input. An exemplary binary weighting would be to make resistors 15 and 16 equal to 1R, each resulting in a total resistance for that path equal to 2R, making resistor 17 equal to 3R and resistor 18 equal to 1R, resulting in a total resistance for that path equal to 4R, making resistor 19 equal to 7R and resistor 20 equal to 1R, resulting in a total resistance for that path equal to 8R. If additional summing resistance paths are used for digital information with additional orders of significance, the resistance values of each additional path should be selected according to the exemplified weighting. As a result, FIG. 1 idealistically appears to provide a comparatively simple means for converting and inserting a digital quantity into an analog computer system.

However, as indicated above, problems arise relating to the selection of the particular construction of the switch 4 which is placed in each of the summing resistance paths and in the input to summing amplifier 6 to provide for a phase (or polarity) reversal of the reference voltage. Referring to FIG. 2a, there is shown an ideal switch for an electrical circuit. It is ideal in its operating characteristic inasmuch as it acts as an infinite resistance ($R=\infty$) to the electrical circuit when it is open and a very small or zero resistance ($R=\infty$) when it is closed. Such an ideal switch operation can be obtained from many well known commercially available mechanical electrical switches. The use of such an ideal mechanical switch in the digital-to-analog conversion shown in FIG. 1 will result in a highly accurate operation because of the close tolerance which may be obtained in the scaling of the parallel resistance paths for each order of significance during both the open and closed switch modes of operation. However, as suggested hereinabove, the use of mechanical switching significantly restricts the speeds at which the digital information may be converted and inserted in the analog computer system. One solution to this problem has been to substitute an electronic clamp circuit which will act as a switch for each of the mechanical switches. Such a clamp circuit is electrically represented as shown in FIG. 2b.

Although the electronic clamping circuit of FIG. 2b will exhibit a very large and substantially infinite resistance ($R=\infty$) during its open switch condition, it will have a significant resistance ($R=Rc$) corresponding to the internal conduction resistance of the electronic devices in the clamping circuit during the closed switch mode of operation. As a result of this significant resistance Rc, the use of the conventional electronic clamping circuit for each of the plural electronic switching means 4 in the digital-to-analog converter of FIG. 1 will render the scaling of the parallel summing resistance paths inaccurate by a variable amount depending upon the number and the respective order of significance of the parallel path in which the closed switches are located. It is emphasized that the particular switches which will be in the closed switch mode of operation will be variable in accordance with the instantaneous digital information being converted. This limitation is especially important because a digital computer by its nature may be a high accuracy device and will usually be used in conjunction with an analog computer for this particular quality. If the conversion of the digital information and its insertion in an analog computer system results in inaccuracies, the benefits accruing to the technique will be greatly reduced. If a new and improved bistable electronic switch incorporating the teachings of the present invention were utilized as plural switches 4 of FIG. 1, this accuracy problem will be greatly diminished in addition to having an important advantage of making the conversion technique usable for both A.C. and D.C. computer systems.

Such an improved electronic switch is shown in abbreviated equivalent electrical diagram form in FIG. 2c and will be described hereinafter in considerable detail in connection with FIG. 3. In FIG. 2c, Rc represents the internal resistance of the electronic devices in the switching circuit during conduction corresponding to the closed switch mode of operation, while Eg represents an equivalent voltage source which is, in turn, connected to monitor the voltage level of the output terminal 30 via its control circuit. As a result of this monitoring, the resistance of the circuit, which would ordinarily be equal to Rc when the switch is in its closed switch mode of operation, is reduced by the feedback provided from the output terminal 30 to the control circuit equivalent generator Eg. Such a technique, per se, is well known in feedback amplifier design where it is desired to reduce the amplifier resistance. However, in the present equivalent circuit, further switch means are provided to isolate the output terminal of FIG. 2c from the equivalent generator Eg during the open switch mode of operation. It is the combination of these features with which the teachings of the present invention are concerned.

Referring now to FIG. 3, there is shown a preferred embodiment of the improved electronic switch having an electrical equivalent which is shown in FIG. 2c. Therein, terminal 30 represents the output terminal which it is alternately desired to connect to a signal reference and isolate from a signal reference source. This signal reference is shown in FIG. 3 as signal ground. During the closed switch mode, it is desired to maintain the output terminal at signal ground level; while during the open switch mode, it is desired to isolate the output terminal from ground. As indicated hereinabove, the improved bistable electronic switch shown in FIG. 3 may be utilized for each switch 4 shown in the digital-to-analog converter of FIG. 1. Because it is desired that FIG. 1 operate for either A.C. or D.C. digital-to-analog conversion systems, it is important that the improved bistable electronic switch be able to continuously and bidirectionally modify the voltage level of terminal 30 to correspond with signal ground during the closed switch mode of operation.

Referring to the details of FIG. 3, terminal 30 is shown connected to the control grid of a cathode follower 31; and the signal reference source, shown herein as signal ground, is connected to the control grid of another cathode follower 32. The plate of cathode follower 31 is connected to a positive D.C. supply voltage, and its cathode is connected to a negative D.C. supply voltage through cathode resistors 33 and 58. Likewise, the plate of cathode follower 32 is shown connected to a positive D.C. supply voltage, while its cathode is shown connected to a negative D.C. supply voltage through cathode resistors 34 and 59. The output of cathode follower 32 is shown taken from the cathode and applied to the control grid of a voltage amplifier 37 through a parallel connection of a current limiting resistor 35 and a capacitor 36 for improving rise and fall times. The cathode of voltage amplifier 37 is connected to the cathode of cathode follower 31 by a steering diode 38, and the plate of voltage amplifier 37 is connected to the plate of cathode follower 31 through resistor 39. As will be described more fully hereinafter, steering diode 38 is oriented to be forwardly biased (based on conventional current flow) during the closed switch mode of operation so that the output voltage of voltage amplifier 37 represents any differential between the output voltage of cathode follower 31 corresponding to the voltage level of output terminal 30 with respect to the output of cathode follower 32 corresponding to the voltage level of signal ground. Resistor 58 provides a positive cathode bias for voltage amplifier 37.

Likewise, the cathode of cathode follower 31 is connected to the control grid of the voltage amplifier 40 through a parallel combination of a grid current limiting resistor 41 and a capacitor 42 for improving rise and fall times. The cathode of voltage amplifier 40 is connected to the cathode of cathode follower 32 through steering diode 43, and the plate of voltage amplifier 40 is connected to the plate of cathode follower 32 via resistor 44. As will be described more fully hereinafter, steering diode 43 is oriented to be forwardly biased during the closed switch mode of operation so that the output voltage of voltage amplifier 40 represents any differential between the output voltage of cathode follower 32 corresponding to the voltage level of signal ground with respect to the output of cathode follower 31 corresponding to the voltage level of output terminal 30. Resistor 59 provides a positive cathode bias for voltage amplifier 40.

Output terminal 30 is also connected to the junction of the cathode of an isolating diode 45 and the plate of voltage amplifier 46. The cathode of voltage amplifier 46 is connected to the negative D.C. supply voltage, while the plate of isolating diode 45 is connected through resistor 66 to the cathode of cathode follower 47 having a plate which is connected to a positive D.C. supply voltage. The cathode of cathode follower 47 is also connected to the negative D.C. supply voltage through a cathode load resistor 56. As connected, voltage amplifier 46, isolating diode 45 and cathode follower 47 form a voltage divider which operates in a manner such that the conduction of either cathode follower 47, voltage amplifier 46, or both, may be controlled to vary the voltage level of the output terminal 30. As shown, the plate of voltage amplifier 40 is connected to the control grid of cathode follower 47 via a parallel combination of grid current limiting resistor 48 and speed-up capacitor 49, while the plate of voltage amplifier 37 is connected to the control grid of voltage amplifier 46 via a parallel combination of grid current limiting resistor 50 and speed-up capacitor 65. The bias for the biasing control grid of cathode follower 47 is supplied from a negative bias supply voltage through biasing resistor 52, and the bias for the control grid of voltage amplifier 46 is provided by a negative biasing voltage through biasing resistor 53.

When steering diodes 38 and 43 are forwardly biased, the voltage output from voltage amplifier 40 controls the conduction of cathode follower 47, and the voltage output from voltage amplifier 37 controls the conduction of voltage amplifier 46 so that the voltage at output terminal 30 may be bidirectionally controlled to tend to be maintained equal to signal ground. It is the bidirectional control of the voltage level output terminal 30 that enables the electronic switch of FIG. 3 to maintain the scaling accuracy of the digital-to-analog conversion combination of FIG. 1 for either A.C. or D.C. analog systems.

As shown, the cathode of voltage amplifier 40 is connected to the cathode of cathode follower 47 via a steering diode 54, and the cathode of voltage amplifier 37 is connected to the cathode of cathode follower 47 through steering diode 55. Because the cathodes of cathode follower 47 and voltage amplifier 40 are tied together and the plate of amplifier 40 is connected to the control grid of cathode follower 47, they form what is known to those skilled in the art as a cathode coupled bistable multivibrator. One stable state of this bistable multivibrator may be considered to correspond to the closed switch mode of operation, and the other stable state may be considered to correspond to the open switch mode of operation. Moreover, voltage amplifier 37 is connected to follow voltage amplifier 40 from one stable state to the other.

During the bistable condition corresponding to the closed switch mode of operation, voltage amplifier 40 is in a normal conducting state, while cathode follower 47 is in a hard conducting state. Voltage amplifier 37, which is connected to follow voltage amplifier 40, is also in its normal conducting state. During this condition, the cathodes of voltage amplifiers 40 and 37 are at approximately zero volts. Since biasing resistors 56 and 66 were selected so that the cathode of cathode follower 47 was slightly positive during hard conduction, steering diodes 54 and 55 will be reversely biased during the corresponding closed switch mode of operation. On the other hand, steering diodes 38 and 43 will be forwardly biased. Moreover, whenever output terminal 30 deviates from the signal ground voltage level, the voltage level of the cathode of cathode follower 31 will vary with respect to the voltage of the cathode of cathode follower 32, and the conduction of voltage amplifiers 40 and 37 will be increased or decreased in push-pull relationship with one another in accordance with the instantaneous magnitude and direction of that deviation. Accordingly, voltage amplifier 40 will vary the hard conduction of cathode follower 47, and voltage amplifier 37 will modify the conduction of voltage amplifier 46 in accordance with the magnitude and direction of the deviation of output terminal 30 from signal ground. As a result of the modification of the hard conduction of cathode follower 47 and the corresponding modification of the voltage level of its cathode, the conduction of isolating diode 45 is varied in a manner so as to tend to drive the voltage level of output terminal 30 toward signal ground. Likewise, the variation of the conduction of voltage amplifier 46 will modify the voltage level of its plate and output terminal 30. Whenever isolating diode 45 acts to raise the voltage level of the output terminal 30, voltage amplifier 46 will also aid in raising the voltage level thereof. Similarly, when isolation diode 45 acts to lower the voltage level of output terminal 30, voltage amplifier 46 will also aid in lowering the voltage level thereof. Thus, isolation diode 45 and voltage amplifier 46 coact to bidirectionally alter the voltage level of output terminal 30 such that it will tend to be equal to signal ground.

On the other hand, if it is desired that the new and improved electronic switch act in its open switch mode of operation, voltage amplifier 40 and cathode follower 47 may be switched to their other stable condition. Many techniques are known to those skilled in the art for switching the bistable multivibrator from one state to another. By way of example, a negative spike may be applied to the control grid of cathode follower 47, thereby driving it from a slightly positive voltage level to a negative voltage level in the direction of the negative D.C. supply voltage being applied to the cathode load resistor 56. The level of conduction of cathode follower 47 then decreases and the cathode thereof goes negative. When the voltage level of the cathode of cathode follower 47 goes negative, steering diodes 54 and 55 will be forwardly biased, thereby causing the cathodes of voltage amplifiers 40 and 37 to follow the level of the cathode of cathode follower 47. Steering diodes 38 and 43 will then be reversely biased. As a result, voltage amplifiers 40 and 37 are effectively driven to a hard conducting condition (saturation) so that the voltage level of their plates will fall away from the positive D.C. supply voltages, thereby decreasing the positive voltage being applied to the control grid of cathode follower 47 and voltage amplifier 46.

This action drives the cathode voltage level of cathode follower 47 still further negative and voltage amplifier 40 further into saturation in a regenerative manner. This action is effective to hold voltage amplifier 40 and cathode follower 47 in the bistable condition corresponding to the open switch mode of operation. The voltage level of the plate of isolating diode 45 then goes below the voltage level of its cathode, thereby cutting off isolating diode 45. In addition, voltage amplifier 46 is driven to a non-conducting condition as a result of the decreased positive going voltage being applied to its control grid, and output terminal 30 is totally isolated. It will be noted that the output terminal 30 sees a very high impedance in the input of cathode follower 31. As indicated hereinabove, when steering diodes 54 and 55 are forwardly biased by the negative voltage level of the cathode of cathode follower 47, steering diodes 43 and 38 are reversely biased, thereby isolating voltage amplifiers 40 and 37 from cathode followers 32 and 31. As a result of the isolation of output terminal 30 during the bistable condition corresponding to the open switch mode of operation, it tends to present a very high impedance approaching infinity to any circuit to which it is connected. Similarly, a positive pulse may be applied to the control grid for driving cathode follower 47 from a state of low conduction to a state of high conduction (from an open switch mode to the closed switch mode). As shown in FIG. 3, these positive and negative pulses may be derived when desired by applying a rectangular waveform to a conventional differentiating means 57. Differentiating means 57 may, by way of example, comprise a conventional resistance and capacitance differentiating circuit.

Thus, a new and improved bistable electronic switch embodying the teachings of the present invention and illustrated in FIG. 3 may be substituted for each of the switches shown in the digital-to-analog converter system illustrated in FIG. 1 to provide very high accuracy by reason of the fact that each common junction of the summing resistors of each parallel resistance path may alternately present very high or effectively infinite impedance to signal ground when it is desired to isolate the common junction from ground, or present a very low resistance equal to $$\frac{R_c}{1-A}$$

between each common junction and signal ground when it is desired to ground each common junction. It should be clear that terminal 30 of FIG. 3, hereinabove referred to as output terminal 30, would be connected to the common junction and signal ground would correspond to the signal reference source. $R_c$ may be thought of as equal to a function of the internal impedance of voltage amplifier 46, isolation diode 45, cathode follower 47 and cathode load resistor 56. Moreover, A may be considered as representing the net gain of the total push-pull voltage regulation system for output terminal 30.

As set forth hereinabove, the new and improved bistable electronic switch of FIG. 3 may, by way of example, be switched from one state corresponding to the hard conduction of cathode follower 47 to the other state corresponding to a very low conduction (from a closed switch mode to an open switch mode) in cathode follower 47 by a negative pulse being applied to the control grid of that tube.

Although one improved bistable electronic switch incorporating the features of the present invention, such as that shown in FIG. 3, must be utilized for each of the switches 4 of FIG. 1 to provide the new and improved digital-to-analog conversion, considerable economy may be made by including cathode followers 31 and 32 in one tube envelope and by including voltage amplifiers 37 and 40 in one tube envelope. In addition, cathode follower 47, isolating diode 45 and voltage amplifier 46 each may be included in an envelope with the corresponding tube of an adjacent parallel resistance path.

While the present invention has been described as utilizing vacuum tubes, it should be understood that semiconductor type devices may well be substituted by those skilled in the art without departing from the teachings of the present device. Moreover, it should be understood that in considering the operation of the improved electronic switch means, the terms resistance and impedance may be considered to be interchangeable.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic switch comprising an output terminal, a signal reference source, a first, second and third cathode follower, each having a plate grid and cathode, said grid of said first cathode follower being connected to said output terminal, said grid of said second cathode follower being connected to said signal reference source, a first, second and third voltage amplifier, each having a plate grid and cathode, a first, second, third and fourth steering diode, said cathode of said first cathode follower being connected to said cathode of said first voltage amplifier through said first steering diode and directly to said grid of said second voltage amplifier, said cathode of said second cathode follower being connected to said cathode of said second voltage amplifier through said second steering diode and directly to said grid of said first voltage amplifier, said cathode of said first voltage amplifier being connected to said cathode of said third cathode follower through said third steering diode, said cathode of said second voltage amplier being connected to said cathode of said third cathode follower through said fourth steering diode, said plate of said first voltage amplifier being connected to said grid of said third voltage amplifier, said plate of said second voltage amplifier being connected to said grid of said third cathode follower, an isolation diode, said third voltage amplifier, said isolation diode and said third cathode follower being connected in series with the common terminal of said third voltage amplifier and said isolation diode being connected to said output terminal, said second voltage amplifier being connected for bistable operation with said third cathode follower, said electronic switch having a closed switch mode of operation and an open switch mode of operation, said third cathode follower being in high conduction for one bistable condition corresponding to the closed switch mode of operation and in low conduction for the other bistable condition corresponding to the open switch mode of operation, said first, second, third and fourth steering diodes being approximately oriented so that said first and second cathode followers and said first and second voltage amplifiers cooperate to act as a differential amplifier during said closed switch mode of operation to variably control the conduction of said third voltage amplifier and said third cathode follower thereby tending to maintain said output terminal at the voltage level of said signal reference source, said third cathode follower driving said isolation diode and said third voltage amplifier to cut off during the open switch mode of operation thereby isolating said output terminal from said signal reference source.

2. An electronic switch comprising an output terminal, a signal reference source, a first, second and third cathode follower, said first cathode follower having its input connected to said output terminal, said second cathode follower having its input connected to said signal reference source, an electronic switch comprising a first, a second and third voltage amplifier, an isolating diode, said second voltage amplifier being connected for bistable operation with said third cathode follower, said third voltage amplifier, said isolation diode and said third cathode follower being connected in series between a positive and negative bias voltage source such as to comprise a voltage divider at the common terminal between said third voltage amplifier and said isolation diode having a voltage level capable of bidirectional adjustment, said common terminal being connected to said output terminal, said electronic switch having a closed switch mode of operation and an open switch mode of operation, said third cathode follower being in high conduction for one bistable condition corresponding to the closed switch mode of operation and in low conduction for the other bistable condition corresponding to the open switch mode of operation, said first and second cathode followers and said first and second voltage amplifier cooperating to act as a differential amplifier during said closed switch mode of operation to bidirectionally control the conduction of said third voltage amplifier and said third cathode follower thereby tending to maintain said output terminal at the voltage level of said signal reference source, said third cathode follower driving said isolation diode and said third voltage amplifier to cut off during the open switch mode of operation thereby isolating said output terminal from said signal reference source.

3. An electronic switch comprising an output terminal, a signal reference source, a first, second and third cathode follower, said first cathode follower having its input connected to said output terminal, said second cathode follower having its input connected to said signal reference source, an electronic switch comprising a first, second and third voltage amplifier, an isolating diode, said second voltage amplifier being connected for bistable operation with said third cathode follower, said third voltage amplifier, said isolation diode and said third cathode follower being connected in series between a positive and negative bias voltage source such as to comprise a voltage divider at the common terminal between said third voltage amplifier and said isolation diode having a voltage level capable of bidirectional adjustment, said common terminal being connected to said output terminal, said electronic switch having a closed switch mode of operation and an open switch mode of operation, said third cathode follower being in high conduction for one bistable condition corresponding to the closed switch mode of operation and in low conduction for the other bistable condition corresponding to the open switch mode of operation, said first and second cathode followers and said first and second voltage amplifiers cooperating to act as a differential amplifier during said closed switch mode of operation to bidirectionally control the conduction of said third voltage amplifier and said third cathode follower thereby tending to maintain said output terminal at the voltage level of said signal reference source, said third cathode follower driving said isolation diode and said third voltage amplifier to cut off during the open switch mode of operation thereby isolating said output terminal from said signal reference source and means for switching said second voltage amplifier and said third cathode follower from one bistable condition to the other corresponding to the desired switch mode of operation.

4. An electronic switch comprising an output terminal, a signal reference source, a differential amplifier comprising a first cathode follower having a grid connected to said output terminal, a second cathode follower having a grid connected to said signal reference source, a first voltage amplifier connected to sample the voltage output of said first and second cathode followers for providing an output voltage commensurate with the difference of the output voltage of said first cathode follower with respect to the output voltage of said second cathode follower, a second voltage amplifier connected to sample the voltage output of said first and second cathode followers for providing an output voltage commensurate with the difference of the output voltage of said second cathode follower with respect to the output voltage of said first cathode follower, a clamping voltage divider comprising a first and second variable impedance, said first variable impedance connected to receive the output voltage from said first amplifier, said second variable impedance connected to receive the output voltage from said second amplifier, one terminal of each of said first and second variable impedance being connected to said output terminal in a manner so that said output terminal will tend to be driven to be equal to said signal reference.

5. An electronic switch comprising an output terminal, a signal reference source, a differential amplifier comprising a first cathode follower having a grid connected to said output terminal, a second cathode follower having a grid connected to said signal reference source, a first voltage amplifier connected to sample the voltage output of said first and second cathode followers for providing an output voltage commensurate with the difference of the output voltage of said first cathode follower with respect to the output voltage of said second cathode follower, a second voltage amplifier connected to sample the voltage output of said first and second cathode followers for providing an output voltage commensurate with the difference of the output voltage of said second cathode follower with respect to the output voltage of said first cathode follower, a third cathode follower and a third voltage amplifier, each having a plate grid and cathode, said grid of said third voltage amplifier being connected to receive the output voltage from said first voltage amplifier, said grid of said third cathode follower being connected to receive the output voltage from said second voltage amplifier, said second cathode follower and third voltage amplifier being electrically arranged to cooperatively tend to drive said output terminal to a voltage equal to said signal reference source.

6. An electronic switch comprising an output terminal, a signal reference source, a first cathode follower connected to receive an input from said output terminal, a second cathode follower connected to receive an input from said signal reference source, a bistable electronic switch connected to said output terminal, said bistable electronic switch having a closed switch mode of operation and an open switch mode of operation, said bistable electronic switch being connected to the outputs of said first and second cathode followers during said closed switch mode of operation and the output terminal for comparing the voltage level at said output terminal with said signal reference source and bidirectionally modifying the voltage level at said output terminal in a manner tending to drive it equal to said signal reference source, said bistable electronic switch being switched to its other condition during said open switch mode of operation in a manner such as to isolate said output terminal from said signal reference source.

7. An electronic switching system comprising an output terminal, a signal reference source, a first cathode follower connected to receive an input from said output terminal, a second cathode follower connected to receive an input from said signal reference source, a bistable electronic switch, said bistable electronic switch being in one stable condition during the closed switch mode of operation and in the other stable condition during the open switch mode of operation, said bistable electronic switch being connected to the outputs of said first and second cathode followers during said closed switch mode of operation and the output terminal for comparing the voltage level at said output terminal with said signal reference source and bidirectionally modifying the voltage level at said output terminal in a manner tending to drive it equal to said signal reference source, said bistable electronic switch being switched to its other condition during said open switch mode of operation in a manner such as to isolate said output terminal from said signal reference source.

8. An electronic switching system comprising an output terminal, a signal reference source, a first cathode follower connected to receive an input from said output terminal, a second cathode follower connected to receive an input from said signal reference source, a bistable electronic switch, said bistable electronic switch being in one stable condition during a closed switch mode of operation and the other stable condition during an open switch mode of operation, said bistable electronic switch including an electronic voltage divider consisting of a third cathode follower, an isolation diode and a voltage amplifier connected in series between a positive and negative bias voltage source with the common terminal of said third voltage amplifier and said isolation diode being connected to said output terminal, said third cathode follower being in high conduction for one bistable condition corresponding to the closed switch mode of operation and in low conduction for the other bistable condition corresponding to the open switch mode of operation, said first and second cathode followers cooperating to bidirectionally control the conduction of said voltage amplifier and said third cathode follower of said voltage divider during said closed switch mode of operation thereby tending to maintain the output terminal at the voltage level of said signal reference, said third cathode follower driving said isolation diode and said voltage amplifier of said voltage divider to cut off during the open switch mode of operation thereby isolating said output terminal from said signal reference source.

9. An electronic switching system comprising an output terminal, a signal reference source, a first cathode follower connected to receive an input from said output terminal, a second cathode follower connected to receive an input from said signal reference source, a bistable electronic switch, said bistable electronic switch being in one stable condition during a closed switch mode of operation and the other stable condition during an open switch mode of operation, said bistable electronic switch including an electronic voltage divider consisting of a third cathode follower, an isolation diode and a voltage amplifier connected in series between a positive and negative bias voltage source with the common terminal of said third voltage amplifier and said isolation diode being connected to said output terminal, said third cathode follower being in high conduction for one bistable condition corresponding to the closed switch mode of operation and in low conduction for the other bistable condition corresponding to the open switch mode of operation, said first and second cathode followers cooperating to bidirectionally control the conduction of said voltage amplifier and said third cathode follower of said voltage divider during said closed switch mode of operation thereby tending to maintain the output terminal at the voltage level of said signal reference, said third cathode follower driving said isolation diode and said voltage amplifier of said voltage divider to cut off during the open switch mode of operation thereby isolating said output terminal from said signal reference source and means for switching said bistable electronic switch from one bistable condition to the other corresponding to the desired mode of operation.

10. An electronic switch comprising a terminal, a signal reference source, a high input impedance small signal electronic device connected to receive an input from said terminal, a bistable electronic switch including a voltage divider connected to said terminal, said bistable electronic switch having a closed switch mode of operation and an open switch mode of operation, during said closed switch mode of operation said bistable electronic switch being connected to the output of said high input impedance small signal amplifier device and said signal reference source comparing the voltage level at said terminal with said signal reference source for bidirectionally modifying the voltage level at said terminal until it is equal to said signal reference source, during said open switch mode said bistable electronic switch operating to isolate said terminal from said signal reference source.

References Cited in the file of this patent

UNITED STATES PATENTS

| | | |
|---|---|---|
| 2,228,844 | Palmer | Jan. 14, 1941 |
| 2,362,294 | Mittag | Nov. 7, 1944 |
| 2,784,396 | Kaiser et al. | Mar. 5, 1957 |
| 2,791,764 | Gray et al. | May 7, 1957 |
| 2,796,598 | Cartwright | June 18, 1957 |
| 2,820,155 | Linvill | Jan. 14, 1958 |
| 2,984,130 | Martin | July 7, 1959 |

OTHER REFERENCES

"Directly Coupled Transistor Circuits," by Beter et al. Electronics, June 1955, pp. 133 and 134.